United States Patent Office 3,069,440
Patented Dec. 18, 1962

3,069,440
NEW 17-OXYGENATED-Δ"-PROGESTERONES
Joseph P. Joseph, Cliffside Park, N.J., and John P. Dusza, Nanuet, and Seymour Bernstein, New City, N.Y., assignors to American Cyanamid Company, New York, N.Y., a corporation of Maine
No Drawing. Filed Oct. 27, 1961, Ser. No. 148,057
6 Claims. (Cl. 260—397.45)

This invention relates to new steroid compounds. More particularly, it relates to nuclear unsaturated progesterones and methods of preparing the same.

The novel progesterones of the present invention can be illustrated by the following formula:

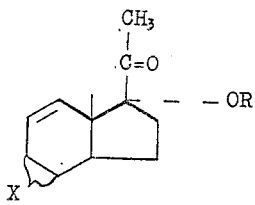

in which R is a member of the group consisting of hydrogen and lower alkanoyl and X is a member of the group consisting of divalent radicals having the formula:

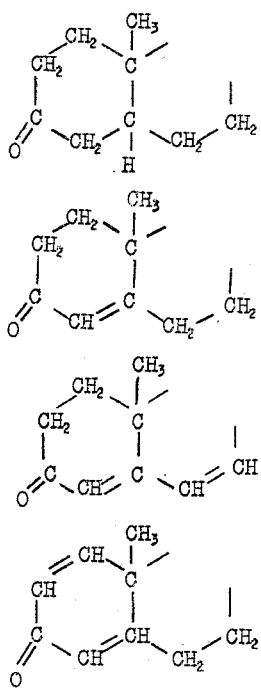

and

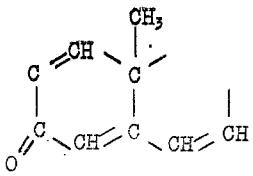

radicals.

The compounds of the present invention are, in general, crystalline solids. They are insoluble in water and somewhat soluble in the usual organic solvents such as chloroform or alcohol.

The present compounds are prepared, for example, starting with pregn-11-ene-3,20-dione (I) which is described by P. Hegner and T. Reichstein, Helv. Chim. Acta. 26, 721 (1943). The above compounds are treated with selenium dioxide in the presence of a lower alkanol such as, for example, methyl alcohol. The product obtained is 3,3-bismethoxypregn-11-en-20-one (II). This compound is treated in solution with oxygen to produce the corresponding 17α-peroxide (III). Without purification the peroxide (III) is dissolved in glacial acetic acid and treated with zinc dust. The product obtained is 17α-hydroxypregn-11-ene-3,20-dione (VI). The latter compound can also be prepared by starting with 16α,17α-epoxy-3α,12α-dihydroxypregnan-20-one (XII) which is dissolved in a solvent and treated with ethylchloroformate. The product resulting is 3α-carboethoxy-16α,17α-epoxy-12α-hydroxypregnan-20-one (XIII). The latter compound is treated with p-toluenesulfonyl chloride to produce 3α-carboethoxy-16α,17α-epoxy-12α-tosyloxypregnan-20-one (XIV). This compound, heated with s-collidine, produces 3α-carboethoxy-16α,17α-epoxy-11-pregnen-20-one (XV). The latter compound, when heated with sodium methoxide, gives 16α,17α-epoxy-3α-hydroxypregn-11-en-20-one (XVI). On treating the latter compound with chromium trioxide in pyridine the compound 16α,17α-epoxypregn-11-ene-3,20-dione (IV) is obtained. The latter compound when treated with hydrogen bromide in glacial acetic acid produces 16β-bromo-17α-hydroxypregn-11-ene-3,20-dione (V). This compound heated with Raney nickel produces 17α-hydroxypregn-11-ene-3,20-dione (VI) which is identical with compound VI prepared above. The latter compound when treated with acetic anhydride in the presence of p-toluenesulfonic acid produces 17α-acetoxypregn-11-ene-3,20-dione (VIII). This compound when heated with 2,3-dichloro-5,6-dicyanobenzoquinone in a solvent produces four compounds which are separated by chromatography: 17α-acetoxypregna-4,11-diene-3,20-dione (VII); 17α-acetoxypregna-4,6,11-triene-3,20-dione (IX); 17α-acetoxypregna-1,4,11-triene-3,20-dione (X) and 17α-acetoxypregna-1,4,6,11-tetraene-3,20-dione. These reactions are shown in the following flowsheet.

FLOWSHEET

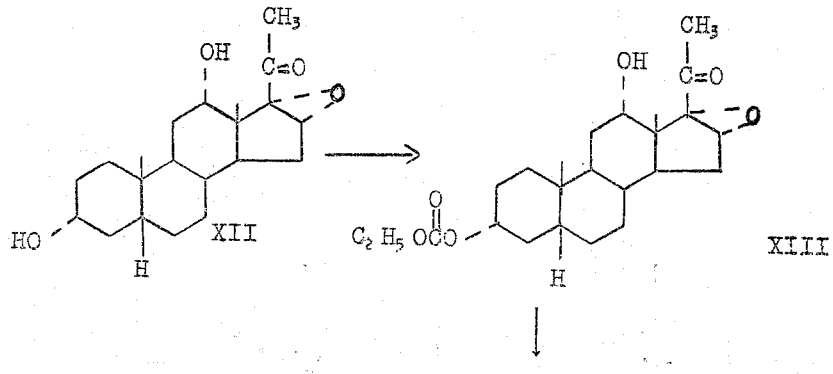

FLOWSHEET—Continued
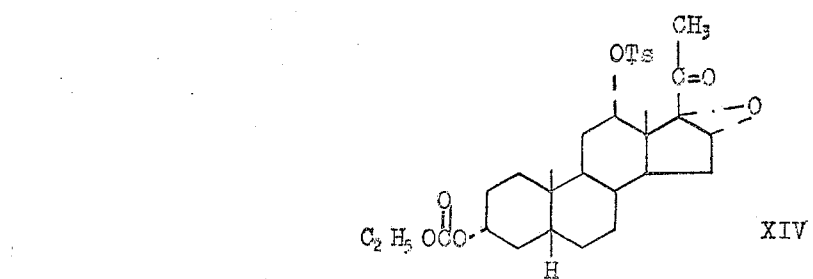
XIV
Ts = $C_6H_5SO_2-$
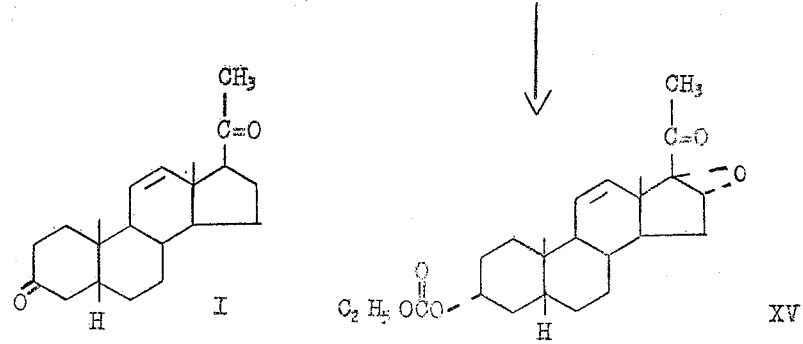
I  XV
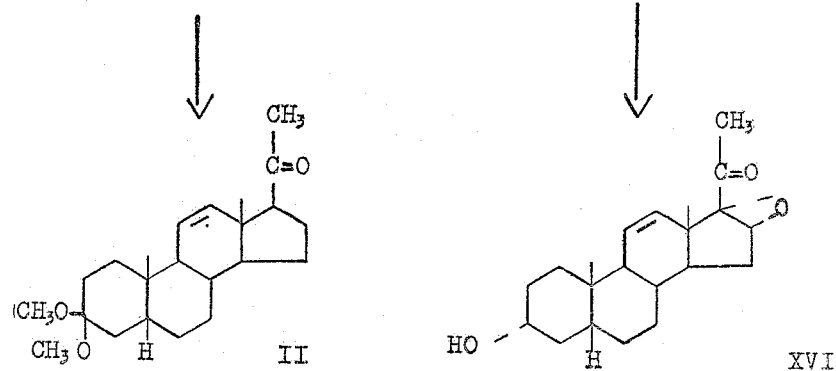
II  XVI
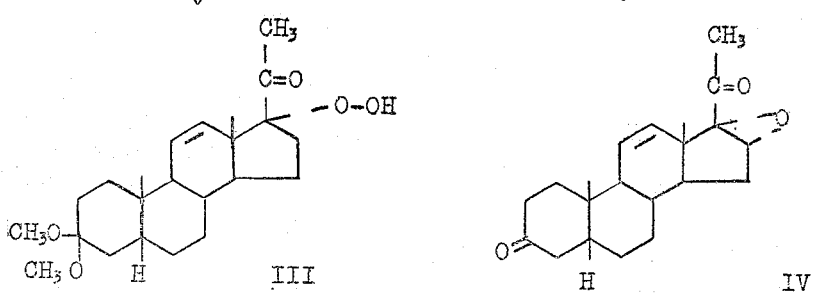
III  IV FLOWSHEET—Continued

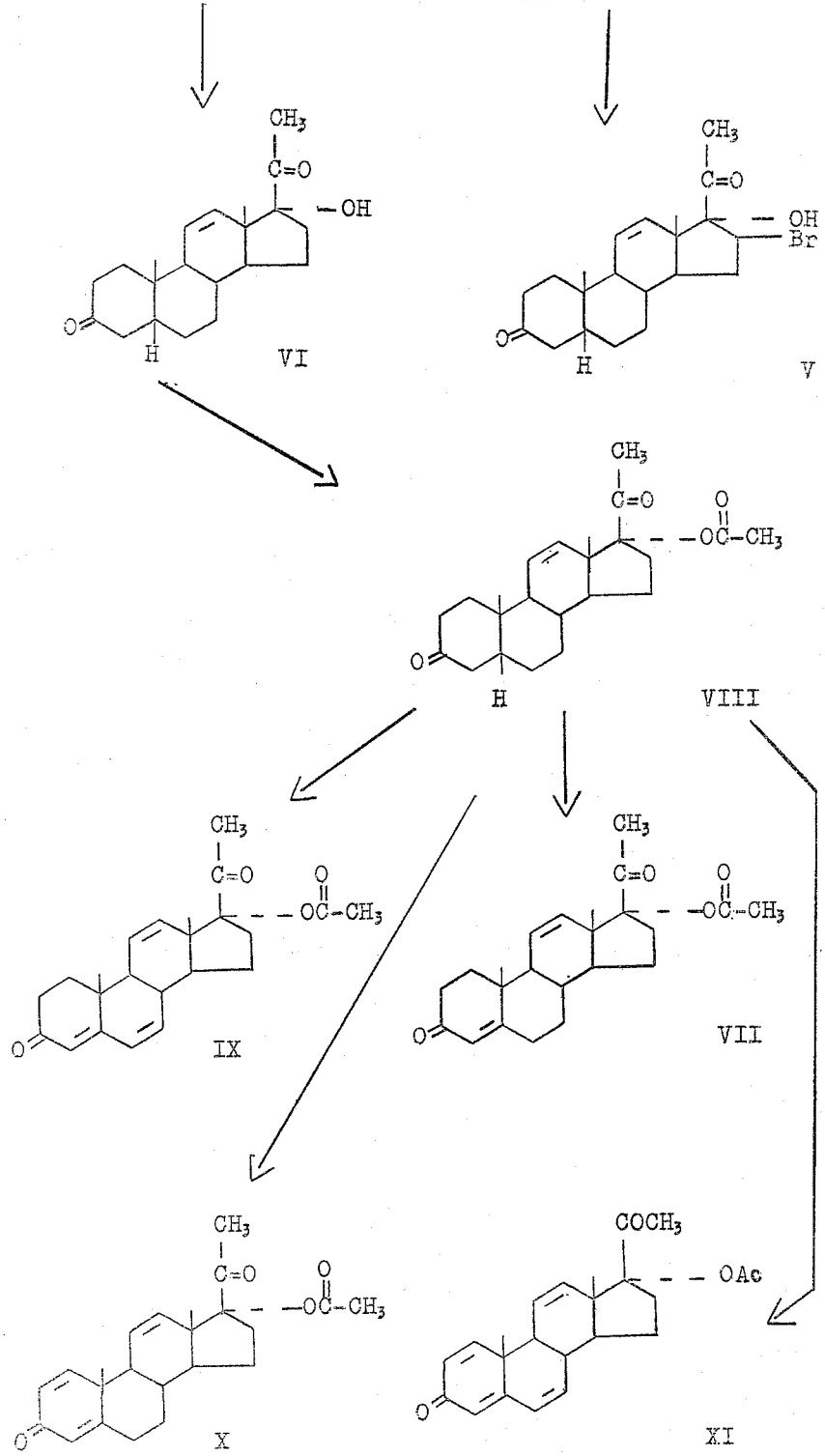

The compounds of the present invention are physiologically active as progestational agents. As such, they are useful for the treatment of threatened and habitual abortion, amenorrhea, dysmenorrhea, premenstrual tension and related gynecological disorders.

The following examples describe in detail the preparation of representative substituted progesterones of the present invention.

EXAMPLE 1

*3,3-Bismethoxypregn-11-En-20-One* (II)

To 500 ml. of methanol is added 18.0 g. of pregn-11-ene-3,20-dione (I) and 18.0 g. of selenium dioxide. The resulting solution is allowed to remain at room temperature for 24 hours. Crystals of II (10.7 g., melting point 135–137° C.) which separate during this time are collected and washed with methanol. The methanol wash is combined with the mother liquors and concentrated under reduced pressure. To this solution is added 18 g. of potassium hydroxide in 360 ml. of methanol. After adding 2 liters of water, tan crystals separate from the solution which are collected by filtration and immediately are recrystallized from methanol containing a few drops of pyridine to give an additional 5.7 g. of II, melting point 136–138° C. A sample is recrystallized from methanol and melts at 137–139° C.

EXAMPLE 2

*17α-Hydroxypregn-11-Ene-3,20-Dione (VI)*

A solution of 320 mg. of 3,3-bismethoxypregn-11-en-20-one (II) is stirred while oxygen is admitted from a calibrated burette. After a slight excess of the theoretical amount of oxygen (21.4 ml.) is consumed the reaction is terminated and neutralized with glacial acetic acid. The mixture is extracted from an aqueous solution with methylene chloride. After drying over magnesium sulfate the solvent is removed under reduced pressure to give 265 mg. crude 17α-peroxide (III). Without purification III is dissolved in 26.5 ml. of glacial acetic acid and 2.65 g. of zinc dust is added with vigorous stirring. After stirring 2 hours at room temperature the reaction mixture is filtered and the zinc residue is washed with glacial acetic acid. The combined filtrate and acid wash are evaporated under reduced pressure (bath temperature 30° C.). To the residue is added methylene chloride and water. The organic layer is separated and is washed with excess sodium bicarbonate solution and water until neutral. After drying and evaporation under reduced pressure a gummy residue results which on trituration with ether gives 10 mg. of crystalline 17α-hydroxypregn-11-ene-3,20-dione (VI).

EXAMPLE 3

*17α-Hydroxypregn-11-Ene-3,20-Dione (VI)*

To a cooled (18° C.) solution of 400 mg. of 16α,17α-epoxy-pregn-11-ene-3,20-dione (IV) in 5 ml. of methylene chloride is added 0.5 ml. of glacial acetic acid. To this is added dropwise over five minutes, 0.4 ml. of 32% hydrogen bromide in glacial acetic acid. After stirring for an additional 20 minutes the solution is poured on ice water and is extracted with methylene chloride. The methylene chloride extracts are washed with water and dried over magnesium sulfate. Evaporation under reduced pressure (bath temperature 25° C.) gives the bromohydrin (V) a gum which crystallizes on trituration with ether, melting point 204–206° C. This material gives a positive Beilstein halogen test. The crude crystalline (V) is suspended in 10 ml. of methanol containing 0.4 ml. of water and 2 gm. of Raney nickel [prepared according to P. L. Julian et al., J. Am. Chem. Soc. 78, 3153 (1956)] is added. The mixture is stirred under reflux for 4 hours and the nickel is removed while hot and washed with methanol. The combined methanol solutions are evaporated under reduced pressure to give a gum. This is dissolved in methylene chloride and is dried over magnesium sulfate. Evaporation of solvent under reduced pressure gives 93 mg. of crystalline 17α-hydroxypregn-11-ene-3,20-dione (VI), melting point 191–194° C. identical by infrared analysis with material obtained in Example 2 above. Recrystallization of a sample raises melting point to 204–206° C.

EXAMPLE 4

*17α-Acetoxypregn-11-Ene-3,20-Dione (VIII)*

Under a nitrogen atmosphere to a solution of 100 mg. of 17α-hydroxypregn-11-ene-3,20-dione (VI) in 3 ml. of acetic acid and 1 ml. acetic anhydride is added 100 mg. of p-toluenesulfonic acid. After 18 hours under nitrogen at room temperature the reaction mixture is poured on ice and water and extracted with methylene chloride. The extract is washed with excess sodium bicarbonate, dried over magnesium sulfate and evaporated under reduced pressure leaving a glass (30 mg.). To an aliquot (70 mg.) of this glass in 1.5 ml. of methanol is added 0.06 ml. of 3.15 N sodium methoxide in methanol. After 20 minutes the solution is neutralized with acetic acid and evaporated under reduced pressure (bath temperature 20–25° C.) The residue is dissolved in methylene chloride and filtered to remove inorganic salts. The filtrate on evaporation under reduced pressure gives a gum which crystallizes on trituration with petroleum-ether (50–70° C.) to give 48 mg. of 17α-acetoxypregn-11-ene-3,20-dione (VIII), melting point 165–171° C. Several recrystallizations from aqueous methanol raises the melting point to 185–187° C.

EXAMPLE 5

*17α-Acetoxypregna-4,11-Diene-3,20-Dione (VII)*

*17α-Acetoxypregna-4,6,11-Triene-3,20-Dione (IX)*

*17α-Acetoxypregna-1,4,11-Triene-3,20-Dione (X)*

*17α-Acetoxypregna-1,4,6,11-Tetraene-3,20-Dione (XI)*

In 5 ml. of dioxane 585 mg. of 17α-acetoxypregn-11-ene-3,20-dione (VIII) and 600 mg. of 2,3-dichloro-5,6-dicyanobenzoquinone are dissolved and refluxed for 18 hours. The reaction mixture is evaporated under reduced pressure. The residue is suspended in benzene and the insoluble hydroquinone removed by filtration. The filtrate is concentrated under reduced pressure and added to a column of hydrated magnesium silicate (30 g.). By gradient elution chromatography 0–20% dioxane in petroleum ether (60–70° C.) the column is fractionated (10 ml. cuts taken) and product detected by ultraviolet and infrared analyses. Cuts #241–280 contain compounds VII and IX (44 mg.) and cuts #281–350 contain compounds IX, X and XI (77 mg.).

Partition chromatography on a diatomaceous earth column of cuts 281–350 with methanol:heptane gives 31 mg. of pure 17α-acetoxypregna-1,4,11-triene-3,20-dione (X)

$$\lambda_{max.}^{Methanol}\ 246\ m\mu$$

and 17α-acetoxypregna-1,4,6,11-tetraene-3,20-dione (XI)

$$\lambda_{max.}^{Methanol}\ 223,\ 255\ and\ 300\ m\mu$$

Partition chromatography on a diatomaceous earth column of cuts 241–280 gives 17α-acetoxypregna-4,11-diene-3,20-dione (VII)

$$\lambda_{max.}^{Methanol}\ 240\ m\mu$$

and 17α - acetoxypregna - 4,6,11 - triene-3,20-dione (IX)

$$\lambda_{max.}^{Methanol}\ 285\ m\mu$$

EXAMPLE 6

*Preparation of 3α-Carboethoxy-16α,17α-Epoxy-12α-Hydroxypregnan-20-One (XIII)*

In 3 ml. of reagent pyridine 500 mg. of 16α,17α-epoxy-3α,12α-dihydroxypregnan-20-one (XII) is dissolved and the solution is cooled to 5° C. To this is added 0.42 ml. of ethyl chloroformate and the reaction mixture is allowed to remain at room temperature for 4 hours. It is then poured into 30 ml. of ice water and the mixture is extracted with ether several times. The combined ether extracts are washed with excess saturated aqueous sodium bicarbonate followed by water until neutral. After drying and evaporation pyridine is removed from the residual gum by repeated evaporation with benzene. A glass resulted which crystallizes on the addition of ether, melting point 189–191° C. Recrystallization from acetone-petroleum ether gives XIII, melting point 198–200° C.

EXAMPLE 7

*Preparation of 3α-Carboethoxy-16α,17α-Epoxy-12α-Tosyloxypregnan-20-One (XIV)*

A solution of 1.4 g. of 3α-carboethoxy-16α,17α-epoxy-12α-hydroxypregnan-20-one (XIII) and 2.0 g. of p-toluenesulfonyl chloride in 10 ml. of pyridine is allowed to remain at 37° C. for 4 days, sealed from atmospheric moisture. The clear yellow solution is poured into 100 ml. of water, and the resulting white gum solidifies on standing. The solid is collected by filtration and dissolved in methylene chloride. This solution is washed with excess aqueous saturated sodium bicarbonate and then water until neutral. After drying over magnesium sulfate and evaporation, XIII is obtained as a glass (1.99 g.).

In another experiment, the 12α-tosyloxy steroid XIV is obtained in crystalline form, melting point 176–177° C., which did not change on recrystallization from acetone-petroleum ether.

EXAMPLE 8

*Preparation of 3α-Carboethoxy-16α,17α-Epoxypregn-11-En-20-One (XV)*

In 66 ml. of s-collidine 27.0 g. of crude 3-carboethoxy-16α,17α-epoxy-12α-tosyloxypregnan-20-one (XIV) is refluxed for 24 hours. This is cooled and added to 7 liters of 2 N hydrochloric acid. The mixture is then extracted with chloroform several times. The extracts are combined and washed with water until neutral, dried and evaporated leaving a black gum. This is dissolved in 500 ml. of ether and washed with 100 ml. of N hydrochloric acid and then water. Evaporation of the dried solution gives a dark gum.

This is dissolved in 100 ml. of benzene and added to a column of 500 g. of silica gel (>200 mesh). Elution with benzene:ether (98:2) gives 12.6 g. of crude 3α-carboethoxy-16α,17α-epoxypregn-11-en-20-one (XV) which on trituration with methanol gives 11.3 g. of product, melting point 147–149° C. Further elution of the column with benzene:ether (9:1) gives 4.6 g. of starting material, XIV, melting point 172–175° C.

EXAMPLE 9

*Preparation of 16α,17α-Epoxy-3α-Hydroxypregn-11-En-20-One (XVI)*

In 60 ml. of 0.1 N sodium methoxide in methanol, 1.0 g. of 3α-carboethoxy-16α,17α-epoxypregn - 11 - en-20-one (XV) is dissolved and refluxed for one hour. After evaporation the residue is dissolved in methylene chloride and washed twice with water (neutral to litmus). The methylene chloride solution is dried and evaporated to give a mixture of solid and gum. This is crystallized from acetone-petroleum ether to give 711 mg. of XVI, melting point 169–170° C. Further recrystallization does not alter the melting point.

EXAMPLE 10

*Preparation of 16α,17α-Epoxypregn-11-Ene-3,20-Dione (IV)*

To an ice-cold solution of 1.7 g. of 16α,17α-epoxy-3α-hydroxy-11-pregnen-20-one (XVI) in 36 ml. of pyridine is added a solution of 1.62 g. of chromium trioxide in 18.7 ml. of cold pyridine. The resulting dark brown mixture is stirred for 20 hours at room temperature. To the mixture is added about 50 ml. of methanol and then it is evaporated to give a gum. Benzene is added to remove the last traces of pyridine by evaporation. After the addition of water, methylene chloride is used for extraction. The combined extracts are washed successively with dilute sodium bicarbonate and then water. After drying over magnesium sulfate, the methylene chloride solution is passed through a column of magnesium silicate which on evaporation the dione (IV) (1.52 g.), melting point 143–146° C. Recrystallization of a sample from acetone petroleum ether raises the melting point to 147–149° C.

We claim:

1. A compound of the formula:

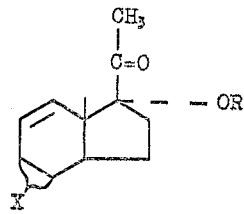

in which R is a member of the group consisting of hydrogen and lower alkanoyl and X is a member of the group consisting of divalent radicals having the formula:

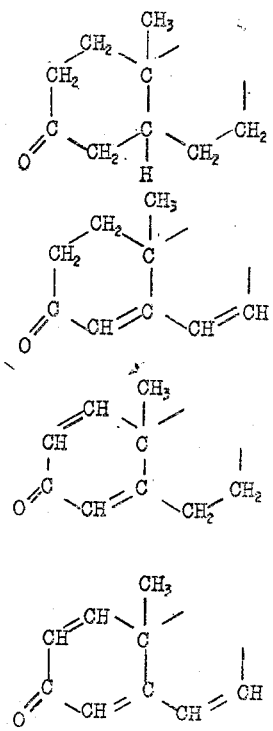

radicals.

2. The compound 17α-hydroxypregn-11-ene-3,20-dione.
3. The compound 17α-acetoxypregn-11-ene-3,20-dione.
4. The compound 17α-acetoxypregna-4,6-11-triene-3,20-dione.
5. The compound 17α-acetoxypregna - 1,4,11 - triene-3,20-dione.
6. The compound 17α-acetoxypregn-1,4,6,11-tetraene-3,20-dione.

References Cited in the file of this patent

UNITED STATES PATENTS 2,782,211   Wettstein et al. _____ Feb. 19, 1957
2,969,304   Wettstein et al. _____ Jan. 24, 1961